US011068379B2

(12) United States Patent
Aoki

(10) Patent No.: US 11,068,379 B2
(45) Date of Patent: *Jul. 20, 2021

(54) SOFTWARE QUALITY DETERMINATION APPARATUS, SOFTWARE QUALITY DETERMINATION METHOD, AND SOFTWARE QUALITY DETERMINATION PROGRAM

(71) Applicant: TOYOTA JIDOSHA KABUSHIKI KAISHA, Toyota (JP)

(72) Inventor: Eisuke Aoki, Nagoya (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 0 days.

This patent is subject to a terminal disclaimer.

(21) Appl. No.: 16/156,083

(22) Filed: Oct. 10, 2018

(65) Prior Publication Data
US 2019/0163611 A1 May 30, 2019

(30) Foreign Application Priority Data
Nov. 29, 2017 (JP) .............................. JP2017-229603

(51) Int. Cl.
*G06F 11/36* (2006.01)
(52) U.S. Cl.
CPC ...... *G06F 11/3648* (2013.01); *G06F 11/3616* (2013.01)
(58) Field of Classification Search
CPC .. G06F 11/36; G06F 11/3692; G06F 11/3676; G06F 11/3648; G06F 11/3616
See application file for complete search history.

(56) References Cited

U.S. PATENT DOCUMENTS 8,032,863 B2  10/2011  Kolawa
9,244,810 B2   1/2016  Alfieri
(Continued)

FOREIGN PATENT DOCUMENTS

CN   105095086 A   11/2015
CN   106528433 A    3/2017
(Continued)

OTHER PUBLICATIONS

Khun et al; Software fault interactions and implications for software testing, 4 mpages (Year: 2004).*

(Continued)

*Primary Examiner* — Wei Y Zhen
*Assistant Examiner* — Brahim Bourzik
(74) *Attorney, Agent, or Firm* — Oblon, McClelland, Maier & Neustadt, L.L.P.

(57) ABSTRACT

A software quality determination apparatus includes: a bug detection rate calculator configured to calculate, for each test viewpoint, which is a viewpoint when a system is tested, a detection rate of a bug generated in a test of the test viewpoint; and a bug convergence determination unit configured to determine, for the each test viewpoint, the bug convergence of the test viewpoint depending on whether the calculated detection rate of the test viewpoint is equal to or smaller than a reference value, which serves as a reference of the detection rate of the test viewpoint after a test execution amount of the test viewpoint has reached an execution reference amount, which serves as a reference of the execution amount of the test viewpoint.

4 Claims, 19 Drawing Sheets

(56) References Cited

U.S. PATENT DOCUMENTS

| | | | |
|---|---|---|---|
| 2005/0114829 A1* | 5/2005 | Robin | G06Q 10/06 717/101 |
| 2006/0123389 A1* | 6/2006 | Kolawa | G06F 11/3616 717/101 |
| 2009/0265681 A1* | 10/2009 | Beto | G06F 11/3672 717/100 |
| 2010/0030626 A1 | 2/2010 | Hughes | |
| 2013/0031423 A1 | 1/2013 | Barrow | |
| 2013/0311968 A1* | 11/2013 | Sharma | G06F 11/3692 717/101 |
| 2014/0033174 A1 | 1/2014 | Farchi et al. | |
| 2014/0173561 A1 | 6/2014 | Toub | |
| 2015/0169380 A1 | 6/2015 | Inoue | |
| 2015/0317235 A1* | 11/2015 | Lachambre | G06F 11/3668 717/126 |
| 2016/0077942 A1* | 3/2016 | He | G06F 11/3034 714/43 |
| 2016/0321586 A1* | 11/2016 | Herzig | G06Q 10/06313 |
| 2016/0364319 A1 | 12/2016 | Che | |
| 2017/0161180 A1* | 6/2017 | Raghavan | G06F 11/3684 |
| 2018/0060221 A1* | 3/2018 | Yim | G06F 11/3684 |
| 2018/0276103 A1 | 9/2018 | Woulfe | |
| 2019/0026216 A1 | 1/2019 | Mankovskii | |
| 2019/0079854 A1* | 3/2019 | Lassance Oliveira E Silva | G06F 11/3692 |
| 2019/0156249 A1 | 5/2019 | Nakata | |

FOREIGN PATENT DOCUMENTS

| | | | |
|---|---|---|---|
| JP | 2008033662 A | 2/2008 | |
| JP | 2010113527 A | 5/2010 | |
| JP | 4646248 B2 | 12/2010 | |
| JP | 2014-174895 | 9/2014 | |
| JP | 2014174895 A | 9/2014 | |
| JP | 2014203095 A | 10/2014 | |
| JP | 2018-026056 | 2/2018 | |
| JP | 6583191 B2 * | 10/2019 | |

OTHER PUBLICATIONS

Pieter et al ;Modeling Bug Report Quality; 10 pages (Year: 2007).*

"Revised Edition, Embedded Software Development Quality Reference Guide," Software Engineering Center, Technology Headquarters, Information-Technology Promotion Agency, Independent Administrative Agency, 2012, 3 Pages.

Takashi Yamazaki, "Defect removal by ODC analysis and visualization of quality maturity," Olympus Software Technology Corp., Embedded Technology West 2014 IPA seminar, Jul. 2014, 2 Pages.

"White Papers on Software Development Data, 2016-2017," Software Reliablity Enhancement Center, Technology Headquarters, Information-technology Promotion Agency, independent administrative agency, Oct. 2016, 3 Pages.

Fenton N. et al., "Software Metrics: Roadmap", Proceedings of the Conference on the Future of Software Engineering, ICSE '00, ACM Press, New York, USA, May 1, 2000, pp. 357-370, XP058374916, DOI:10.1145/336512.336588; ISBN: 978-1-58113-253-3.

Killian et al., Finding Latent Performance Bugs in Systems Implementations, ACM Copyright 2010 (Year: 2010).

Software Reliability Enhancement Center, Technology Headquarters, Information-technology Promotion Agency, independent administrative agency, "White Papers on Software Development Data, 2016-2017", 2016, 3 pages.

Yamazaki, T. "Defect removal by ODC analysis and visualization of quality maturity", Olympus Software Technology Corp., Embedded Technology West 2014 IPA seminar, 2014, 2 pages.

* cited by examiner

Fig. 3

| TEST VIEWPOINT |
| --- |
| FUNCTION ADAPTABILITY |
| PERFORMANCE ADAPTABILITY |
| COMPATIBILITY |
| USABILITY |
| RELIABILITY |
| SECURITY |
| MAINTAINABILITY |
| PORTABILITY |

Fig. 4

| TEST PROCESS | TEST VIEWPOINT |
| --- | --- |
| COMBINED TEST | BASIC OPERATIONS |
| | COMBINATION |
| | ORDER·REPEAT |
| | INTERACTIONS |
| SYSTEM TEST | LOAD·STRESS |
| | RECOVERY·EXCEPTIONS |
| | START·RE-START |
| | CONFIGURATION |
| | SCENARIO |

| TEST VIEWPOINT | EVALUATION |
|---|---|
| BASICS | ○ (GOOD) |
| INTERACTIONS | ○ (GOOD) |
| OPERATIONAL SEQUENCE | BUG DETECTION RATE>REFERENCE → × (BAD AND GETTING WORSE) |
| LOAD·STRESS | BUG DETECTION RATE>REFERENCE → × (BAD AND GETTING BETTER) |
| RECOVERY·EXCEPTIONS | BUG DETECTION RATE>REFERENCE → × (EXTREMELY BAD AND GETTING BETTER) |
| GUI | ○ (GOOD) |

Fig. 21

| TEST VIEWPOINT | COMPREHENSIVE EVALUATION | DETAILED EVALUATION ||
|---|---|---|---|
| | | EXECUTION AMOUNT | CONVERGENCE LEVEL |
| BASICS (Phase1) | ◎ (EXCELLENT) | ○ | ◎ |
| INTERACTIONS (Phase2) | ◎ (EXCELLENT) | ○ | ◎ |
| OPERATIONAL SEQUENCE (Phase3) | ○ (GOOD) | ○ | ○ |
| LOAD·STRESS (Phase4) | × (BAD) | × | × |
| RECOVERY·EXCEPTIONS /START·RE-START (Phase5) | — | BEING EXECUTED | |
| CONFIGURATION·SCENARIO (Phase6) | — | NOT EXECUTED | |

Fig. 22

|  | TEST VIEWPOINT | | | | | |
|---|---|---|---|---|---|---|
|  | FUNCTIONALITY | EFFICIENCY | RELIABILITY | USABILITY | MAINTAINABILITY | PORTABILITY |
| AVERAGE TEST EXECUTION REFERENCE AMOUNT (NUMBER OF TESTMAN-HOURS/ KLOC) | A | 0.1A | 0.4A | 0.6A | 1.1A | 0.2A |

Fig. 24

|  | TEST VIEWPOINT | | | | | |
|---|---|---|---|---|---|---|
|  | FUNCTIONALITY | EFFICIENCY | RELIABILITY | USABILITY | MAINTAINABILITY | PORTABILITY |
| COMBINED TEST AVERAGE EXECUTION REFERENCE AMOUNT (NUMBER OF TESTS/KLOC) | A | 0.7A | 0.5A | 0.5A | 0.5A | 0.1A |
| SYSTEM TEST EXECUTION REFERENCE AMOUNT (NUMBER OF TESTS/KLOC) | a | 0.8a | 0.3a | 0.3a | 0.1a | 0.1a |

Fig. 25

SOFTWARE QUALITY DETERMINATION APPARATUS, SOFTWARE QUALITY DETERMINATION METHOD, AND SOFTWARE QUALITY DETERMINATION PROGRAM

CROSS REFERENCE TO RELATED APPLICATIONS

This application is based upon and claims the benefit of priority from Japanese patent application No. 2017-229603, filed on Nov. 29, 2017, the disclosure of which is incorporated herein in its entirety by reference.

BACKGROUND

The present disclosure relates to a software quality determination apparatus, a software quality determination method, and a software quality determination program.

In recent years, techniques for determining convergence of a bug generated in a system have been proposed.

For example, Japanese Unexamined Patent Application Publication No. 2014-174895 discloses a technique of predicting the number of bugs that will be generated in the feature in a system based on previous bug occurrence result data and predicting a convergence timing in which the bug will converge based on the number of bugs that has been predicted and a quality index indicating the quality required for the system.

Further, "Revised Edition, Embedded Software Development Quality Reference guide", 2012, pages 102-103 written and edited by Software Engineering Center, Technology Headquarters, Information-technology Promotion Agency, independent administrative agency (hereinafter this literature will be referred to as Non-Patent Literature 1) discloses a technique of determining that a bug has converged when a rate of increase in the bug detection rate has approached zero in the final stage of the test period.

SUMMARY

However, since the technique disclosed in Japanese Unexamined Patent Application Publication No. 2014-174895 requires the bug occurrence result data, there is a problem that this technique can be applied only to a system that has determined bug convergence before.

On the other hand, the technique disclosed in Non-Patent Literature 1 does not require bug occurrence result data. Therefore, this technique can be applied also to a system in which bug convergence has not been determined before and the problem in Japanese Unexamined Patent Application Publication No. 2014-174895 does not occur in Non-Patent Literature 1.

However, according to the technique disclosed in Non-Patent Literature 1, at the timing when it is determined that the bug has converged, there is a probability that one of test viewpoints, which are viewpoints when the system is tested, in which a bug is actually generated is not being tested. Therefore, just after it is determined that the bug has converged, the bug may be generated and the bug detection rate increases, which may cause the occurrence of an unexpected contingency that the accuracy of determining whether the bug has converged is reduced.

The present disclosure has been made in view of the aforementioned circumstances and provides a software quality determination apparatus, a software quality determination method, and a software quality determination program capable of performing bug convergence determination without using the previous bug occurrence result data and preventing an unexpected reduction in the accuracy of determining whether the bug has converged.

A software quality determination apparatus according to one aspect of the present disclosure is a software quality determination apparatus configured to determine convergence of a bug generated in a system, the apparatus including:

a bug detection rate calculator configured to calculate, for each test viewpoint, which is a viewpoint when the system is tested, a detection rate of a bug generated in a test of the test viewpoint; and a bug convergence determination unit configured to determine, for the each test viewpoint, the bug convergence of the test viewpoint depending on whether the calculated detection rate of the test viewpoint is equal to or smaller than a reference value, which serves as a reference of the detection rate of the test viewpoint after a test execution amount of the test viewpoint has reached an execution reference amount, which serves as a reference of the execution amount of the test viewpoint.

A software quality determination method according to one aspect of the present disclosure is a software quality determination method by a software quality determination apparatus for determining convergence of a bug generated in a system, the method including:

calculating, for each test viewpoint, which is a viewpoint when the system is tested, a detection rate of a bug generated in a test of the test viewpoint; and determining, for the each test viewpoint, the bug convergence of the test viewpoint depending on whether the calculated detection rate of the test viewpoint is equal to or smaller than a reference value, which serves as a reference of the detection rate of the test viewpoint after a test execution amount of the test viewpoint has reached an execution reference amount, which serves as a reference of the execution amount of the test viewpoint.

A software quality determination program according to one aspect of the present disclosure causes a computer that determines convergence of a bug generated in a system to execute the following procedures of:

calculating, for each test viewpoint, which is a viewpoint when the system is tested, a detection rate of a bug generated in a test of the test viewpoint; and determining, for the each test viewpoint, the bug convergence of the test viewpoint depending on whether the calculated detection rate of the test viewpoint is equal to or smaller than a reference value, which serves as a reference of the detection rate of the test viewpoint after a test execution amount of the test viewpoint has reached an execution reference amount, which serves as a reference of the execution amount of the test viewpoint.

According to the aspects of the present disclosure described above, it is possible to provide a software quality determination apparatus, a software quality determination method, and a software quality determination program capable of performing bug convergence determination without using the previous bug occurrence result data and preventing an unexpected reduction in the accuracy of determining whether the bug has converged.

The above and other objects, features and advantages of the present disclosure will become more fully understood from the detailed description given hereinbelow and the accompanying drawings which are given by way of illustration only, and thus are not to be considered as limiting the present disclosure.

BRIEF DESCRIPTION OF DRAWINGS

FIG. 3 is a diagram showing one example of test viewpoints according to the first embodiment;

FIG. 4 is a diagram showing one example of test viewpoints according to the first embodiment;

FIG. 21 is a diagram collectively showing results of determining the bug curves in FIGS. 15-20;

FIG. 22 is a diagram showing one example of a test execution method for each test viewpoint;

FIG. 24 is a diagram showing one example of a test execution reference amount per unit development scale for each test viewpoint according to the second embodiment;

FIG. 25 is a diagram showing one example of the test execution reference amount per unit development scale for each test viewpoint according to the second embodiment.

DESCRIPTION OF EMBODIMENTS

Hereinafter, with reference to the drawings, embodiments of the present disclosure will be explained. Throughout the drawings in the following description, the same or corresponding elements are denoted by the same reference symbols and overlapping descriptions will be omitted as appropriate for the sake of clarification of the description. Further, specific numerical values and the like stated in the following embodiments are merely examples for facilitating understanding of the present disclosure, and are not limited thereto.

First Embodiment

<Configuration of Software Quality Determination Apparatus According to First Embodiment>

First, a configuration of a software quality determination apparatus 1 according to a first embodiment will be explained.

Figure 1:
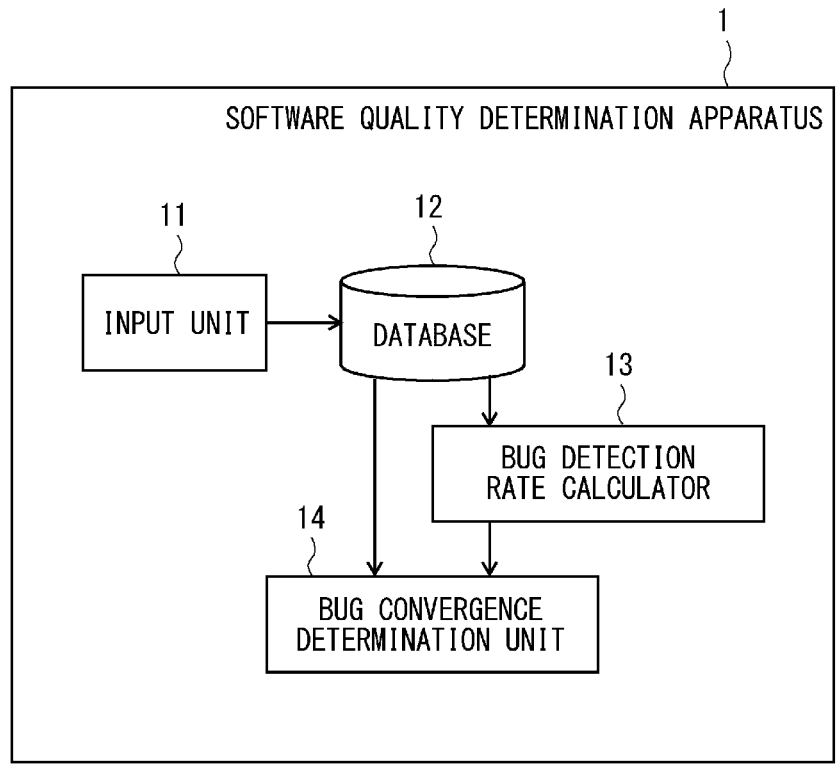
FIG. 1 is a block diagram showing one example of a block configuration of a software quality determination apparatus according to a first embodiment.

FIG. 1 is a block diagram showing one example of a block configuration of the software quality determination apparatus 1 according to the first embodiment. The software quality determination apparatus 1 according to the first embodiment determines convergence of a bug generated in a system (a target to be tested).

As shown in FIG. 1, the software quality determination apparatus 1 according to the first embodiment includes an input unit 11, a database 12, a bug detection rate calculator 13, and a bug convergence determination unit 14.

The input unit 11 is, for example, an input apparatus used by a user to input arbitrary data (the number of bugs that have been detected, a test execution amount and the like described later) into the software quality determination apparatus 1 and set this data in the software quality determination apparatus 1. The input unit 11 is a desired input apparatus such as, for example, a key board, a mouse, a touch screen, or a radio portable terminal (a smartphone, a tablet, etc.).

The database 12 holds data and the like that the user has input into the input unit 11 and set in the input unit 11.

The database 12 holds, for example, for each test viewpoint, which is a viewpoint when the system is tested, the number of bugs that have been generated in the test of the test viewpoint (hereinafter it will be referred to as the number of bugs that have been detected). The test viewpoint is, for example, "angles" when performing the test such as test items, standpoints, and idea generation methods in order to check whether a program is normally operated, and is a standpoint of the operation and the procedure when the test is executed. It is known that the bug can be detected by changing these standpoints.

Further, the database 12 holds, for each test viewpoint, the test execution amount of the test viewpoint (hereinafter it will be referred to as a test execution amount). The test execution amount is, for example, the number of man-hours of the test (hereinafter it will be referred to as the number of test man-hours) and the number of tests.

Further, the database 12 holds, for each test viewpoint, a reference value, which serves as a reference of the detection rate of the bug that has been generated in the test of the test viewpoint (hereinafter this detection rate will be referred to as a bug detection rate). The bug detection rate is a rate obtained by dividing the number of bugs that have been detected by the test execution amount.

Further, the database 12 holds, for each test viewpoint, an execution reference amount, which serves as a reference of the test execution amount of the test viewpoint (hereinafter it will be referred to as a test execution reference amount). The test execution reference amount serves as a trigger for the bug convergence determination unit 14 to perform a bug convergence determination. That is, the bug convergence determination unit 14 performs, for each test viewpoint, bug convergence determination after the test execution amount of the test viewpoint has reached the test execution reference amount of the test viewpoint.

Further, the database 12 holds, for each test viewpoint, an execution reference amount, which serves as a reference of an execution amount of an additional test of the test viewpoint (hereinafter it will be referred to as an additional test execution reference amount). The additional test is a test executed, for each test viewpoint, after the test execution amount of the test viewpoint has reached the test execution reference amount of the test viewpoint.

The bug detection rate calculator 13 calculates, for each test viewpoint, the bug detection rate of the test viewpoint. Specifically, the bug detection rate calculator 13 divides the number of bugs that have been detected held in the database 12 by the test execution amount held in the data base 12, thereby calculating the bug detection rate.

The bug convergence determination unit 14 performs, for each test viewpoint, the bug convergence determination of the test viewpoint depending on whether the bug detection rate of the test viewpoint is equal to or smaller than the reference value of the test viewpoint after the test execution amount of the test viewpoint has reached the test execution reference amount of the test viewpoint. Specifically, the bug convergence determination unit 14 performs the following operation for each test viewpoint. That is, the bug convergence determination unit 14 determines whether the test execution amount held in the database 12 has reached the test execution reference amount held in the database 12. When the test execution amount reaches the test execution reference amount, the bug convergence determination unit 14 performs the bug convergence determination depending on whether the bug detection rate calculated in the bug detection rate calculator 13 is equal to or smaller than the reference value of the bug detection rate held in the database 12.

Various methods may be employed to determine the bug convergence after the test execution amount has reached the test execution reference amount. The following first and second methods may be, for example, employed.

The first method is a method of determining that a bug has converged when the bug detection rate is equal to or smaller than a reference value at the timing when execution of additional tests that correspond to the additional test execution reference amount is ended after the test execution amount has reached the test execution reference amount.

On the other hand, the second method is a method of determining that a bug has converged if a state in which the bug detection rate is equal to or smaller than the reference value continues during a period in which the additional tests that correspond to the additional test execution reference amount are being executed after the test execution amount has reached the test execution reference amount.

The results of the determination of the bug convergence by the bug convergence determination unit 14 may be displayed on a display apparatus (not shown) and presented to the user as necessary. The display apparatus is, for example, a liquid crystal display, an organic Electro Luminescence (EL) display or the like.

<Test Viewpoints According to First Embodiment>

Next, specific examples of the test viewpoints according to the first embodiment will be explained.

Figure 2:
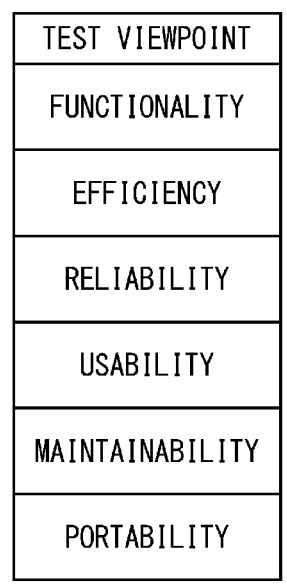
FIG. 2 is a diagram showing one example of test viewpoints according to the first embodiment.

As shown in FIG. 2, the test viewpoints may be quality characteristics of International Organization for Standardization (ISO) 9126. In the example shown in FIG. 2, the test viewpoints are "functionality", "efficiency", "reliability", "usability", "maintainability", and "portability".

Further, as shown in FIG. 3, the test viewpoints may be quality characteristics of next-generation software quality evaluation standards ISO/International Electrotechnical Commission (IEC) 25000 series (SQuaRE: Software product Quality Requirements and Evaluation). In the example shown in FIG. 3, the test viewpoints are "function adaptability", "performance adaptability", "compatibility", "usability", "reliability", "security", "maintainability", and "portability".

Further, as shown in FIG. 4, the test viewpoint may be a discovery trigger, which serves as a trigger for discovering bugs by an Orthogonal Defect Classification (ODC) analysis (regarding the ODC analysis, see, for example, the following Non-Patent Literature 2). In the example shown in FIG. 4, in the case of a combined test, the test viewpoints are "basic operations", "combination", "order•repeat", and "interactions". In the case of a system test, the test viewpoints are "load•stress", "recovery•exceptions", "start•restart", "configuration", and "scenario". The system test, which is a test of the whole software, is also referred to as an integration test or a general test. The combined test indicates all the tests in a state in which some components are absent.

Non-Patent Literature 2: Takashi Yamazaki, Olympus Software Technology Corp., "Defect removal by ODC analysis and visualization of quality maturity", Embedded Technology West 2014 IPA seminar, Jul. 29, 2014, page 30.

<Software Quality Determination Method According to First Embodiment>

Next, a software quality determination method by the software quality determination apparatus 1 according to the first embodiment will be explained.

Figure 5:
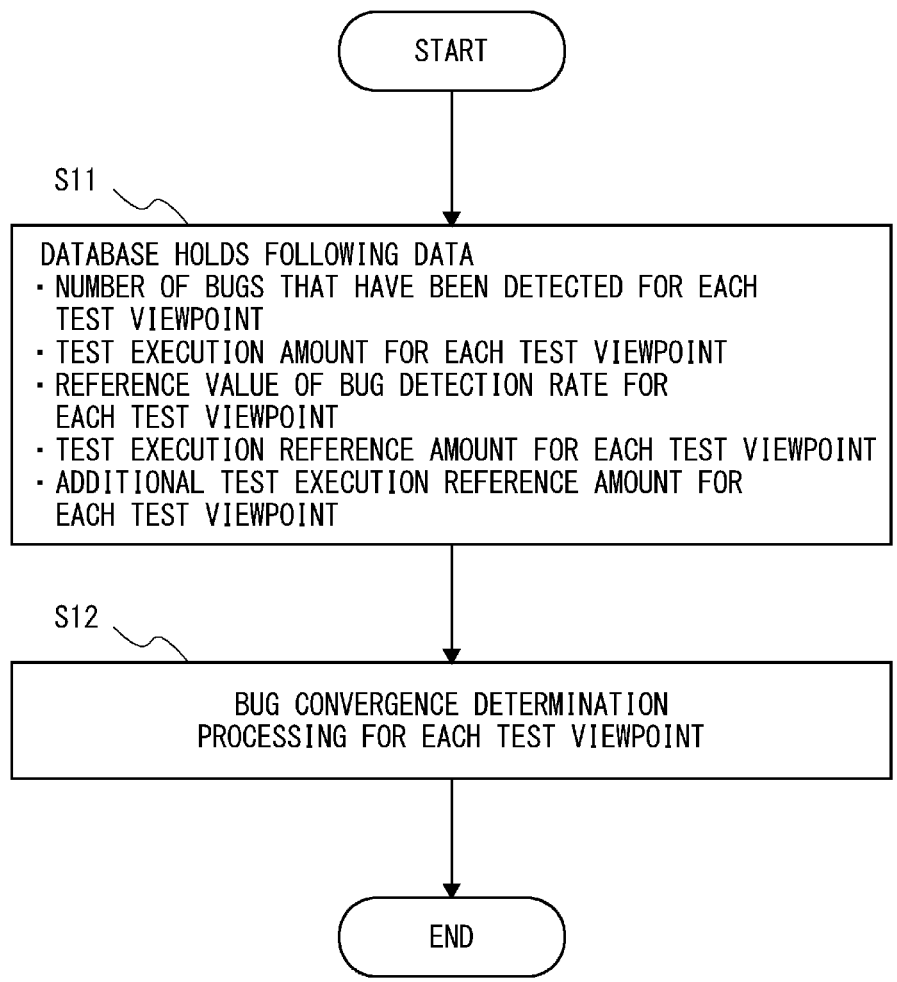
FIG. 5 is a flowchart showing one example of a software quality determination method by the software quality determination apparatus according to the first embodiment.

FIG. 5 is a flowchart showing one example of the software quality determination method by the software quality determination apparatus 1 according to the first embodiment.

As shown in FIG. 5, the database 12 acquires and holds the following data input by the user into the input unit 11 and set in the input unit 11 (Step S11).

the number of bugs that have been detected for each test viewpoint the test execution amount for each test viewpoint the reference value of the bug detection rate for each test viewpoint the test execution reference amount for each test viewpoint additional test execution reference amount for each test viewpoint In the following processing, for each test viewpoint, bug convergence determination processing for determining bug convergence in the test viewpoint is performed by the bug detection rate calculator 13 and the bug convergence determination unit 14 (Step S12).

Next, the bug convergence determination processing in Step S12 shown in FIG. 5 will be explained.

Figure 6:
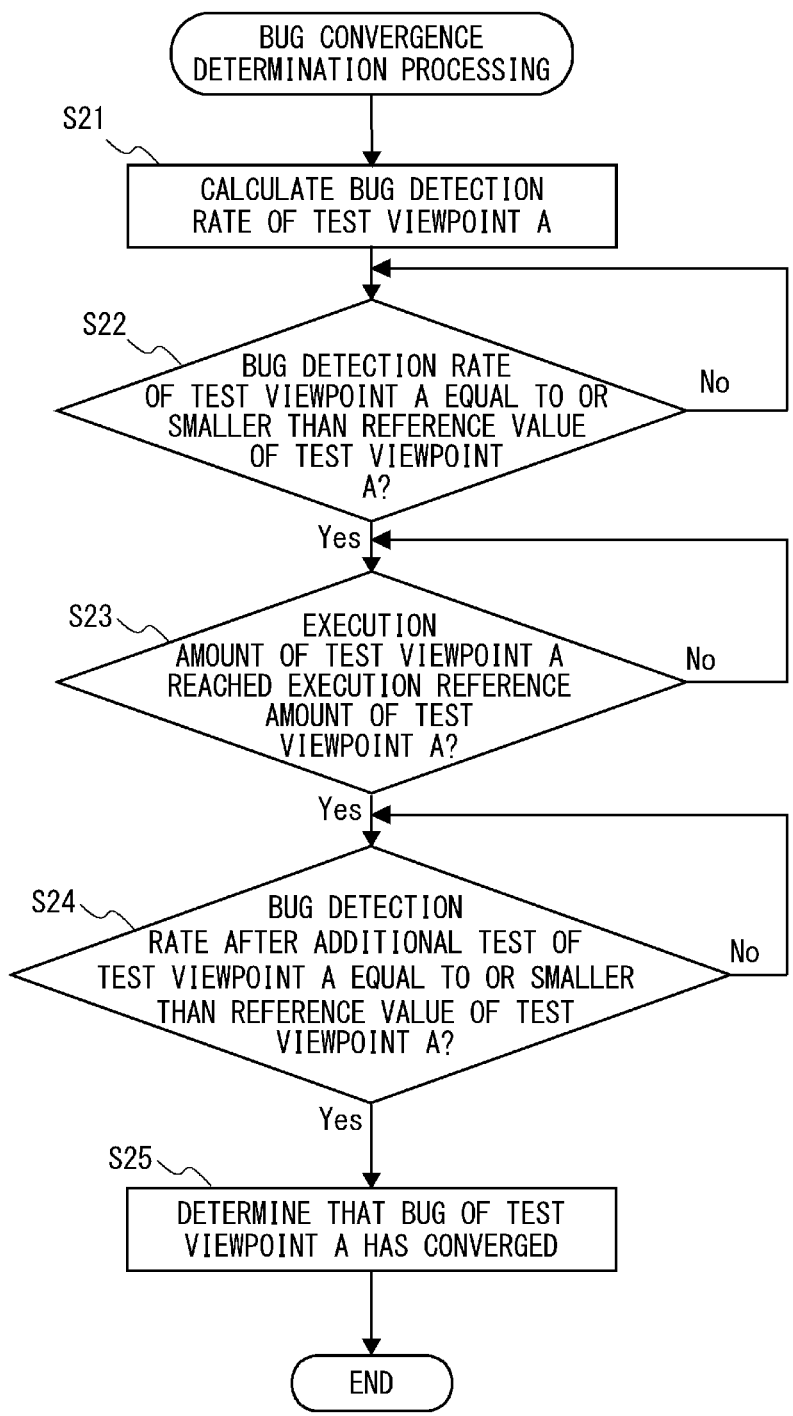
FIG. 6 is a flowchart showing one example of bug convergence determination processing in Step S12 in FIG. 5.
Figure 7:
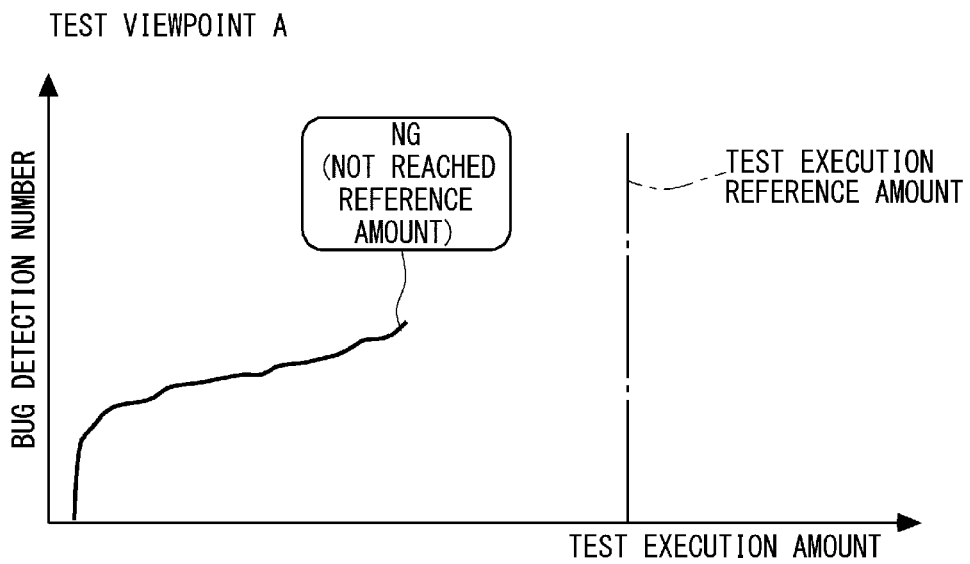
FIG. 7 is a graph showing one example of results of determining a test execution amount of a test viewpoint by the software quality determination apparatus according to the first embodiment.
Figure 8:
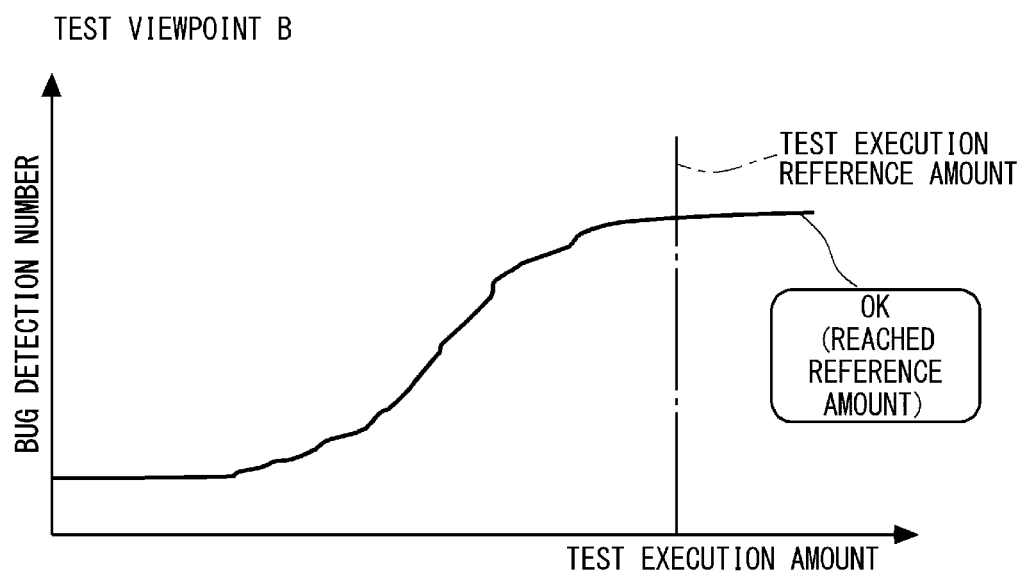
FIG. 8 is a graph showing one example of results of determining a test execution amount of a test viewpoint by the software quality determination apparatus according to the first embodiment.
Figure 9:
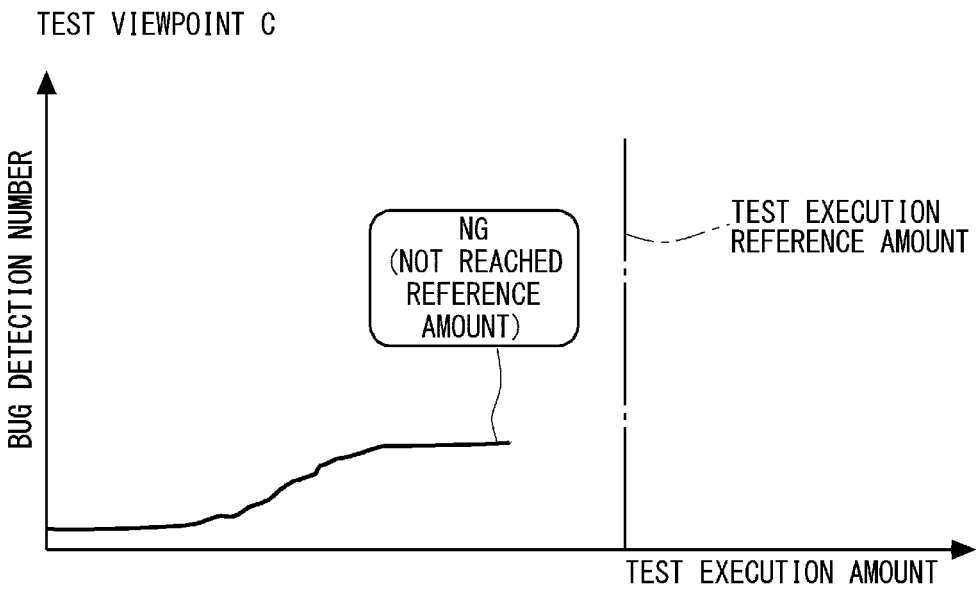
FIG. 9 is a graph showing one example of results of determining a test execution amount of a test viewpoint by the software quality determination apparatus according to the first embodiment.
Figure 10:
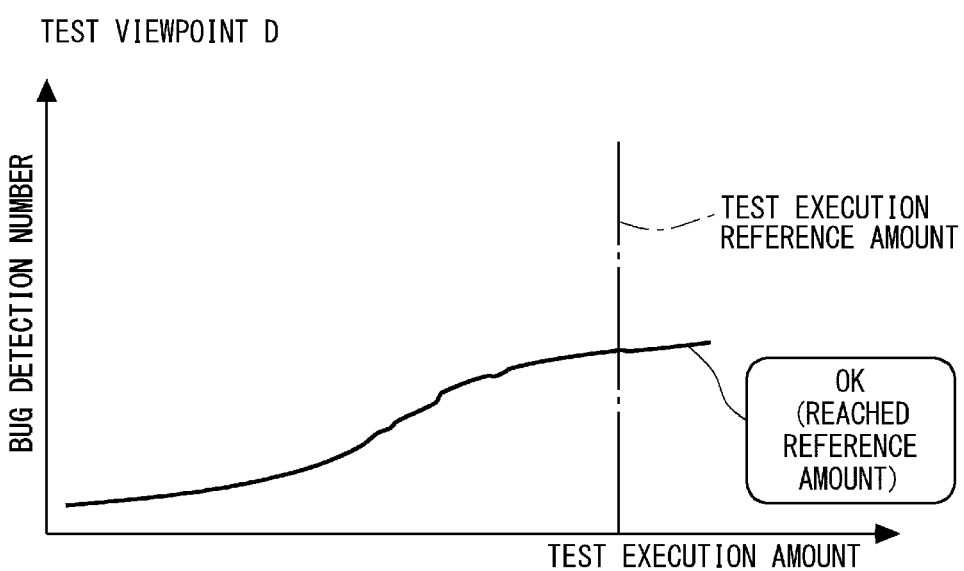
FIG. 10 is a graph showing one example of results of determining a test execution amount of a test viewpoint by the software quality determination apparatus according to the first embodiment.

FIG. 6 is a flowchart showing one example of the bug convergence determination processing in Step S12 shown in FIG. 5. In this example, the aforementioned first method is used to determine the bug convergence after the test execution amount has reached the test execution reference amount. FIG. 6 shows an example of the flow of the bug convergence determination processing of a test viewpoint A.

As shown in FIG. 6, the bug detection rate calculator 13 divides the number of bugs that have been detected of the test viewpoint A held in the database 12 by the test execution amount of the test viewpoint A held in the database 12, thereby calculating the bug detection rate of the test viewpoint A (Step S21).

The bug convergence determination unit 14 determines whether the bug detection rate of the test viewpoint A calculated in the bug detection rate calculator 13 is equal to or smaller than the reference value of the bug detection rate of the test viewpoint A held in the database 12 (Step S22). When the bug detection rate exceeds the reference value (No in Step S22), the process goes back to the processing of Step S21.

When the bug detection rate is equal to or smaller than the reference value (Yes in Step S22), the bug convergence determination unit 14 then determines whether the test execution amount of the test viewpoint A held in the database 12 has reached the test execution reference amount of the test viewpoint A held in the database 12 (Step S23). When the test execution amount has not yet reached the test execution reference amount (No in Step S23), the process goes back to the processing of Step S23.

When the test execution amount reaches the test execution reference amount (Yes in Step S23), next, the additional tests that correspond to the additional test execution reference amount of the test viewpoint A held in the database 12 are executed. The bug convergence determination unit 14 determines, at the timing when the execution of the additional tests that correspond to the additional test execution reference amount of the test viewpoint A have been completed, whether the bug detection rate of the test viewpoint A calculated in the bug detection rate calculator 13 is equal to or smaller than the reference value of the bug detection rate of the test viewpoint A held in the database 12 (Step S24). When the bug detection rate is equal to or smaller than the reference value (Yes in Step S24), the bug convergence determination unit 14 determines that the bug of the test viewpoint A has converged (Step S25) and ends the processing.

When the bug detection rate exceeds the reference value (No in Step S24), the process goes back to the processing of Step S23. In this way, after the test execution amount has reached the test execution reference amount, the additional tests that correspond to the additional test execution reference amount are repeatedly executed until the bug detection rate becomes equal to or smaller than the reference value, and every time the execution of the additional test is ended, the bug convergence determination unit 14 determines whether the bug of the test viewpoint A has converged depending on whether the bug detection rate at this time is equal to or smaller than the reference value.

The aforementioned processing is the flow of the bug convergence determination processing of the test viewpoint A. When there are test viewpoints B, C, and D besides the test viewpoint A, a flow of the bug convergence determination processing similar to that in FIG. 6 is executed also for the test viewpoints B, C, and D.

When the bug convergence determination unit 14 determines that the bug has converged in all the test viewpoints A, B, C, and D, the bug convergence determination unit 14 determines that the system bug converges.

Now, results of the bug convergence determination for each test viewpoint by the software quality determination apparatus 1 according to the first embodiment will be explained with some specific examples.

Figure 11:
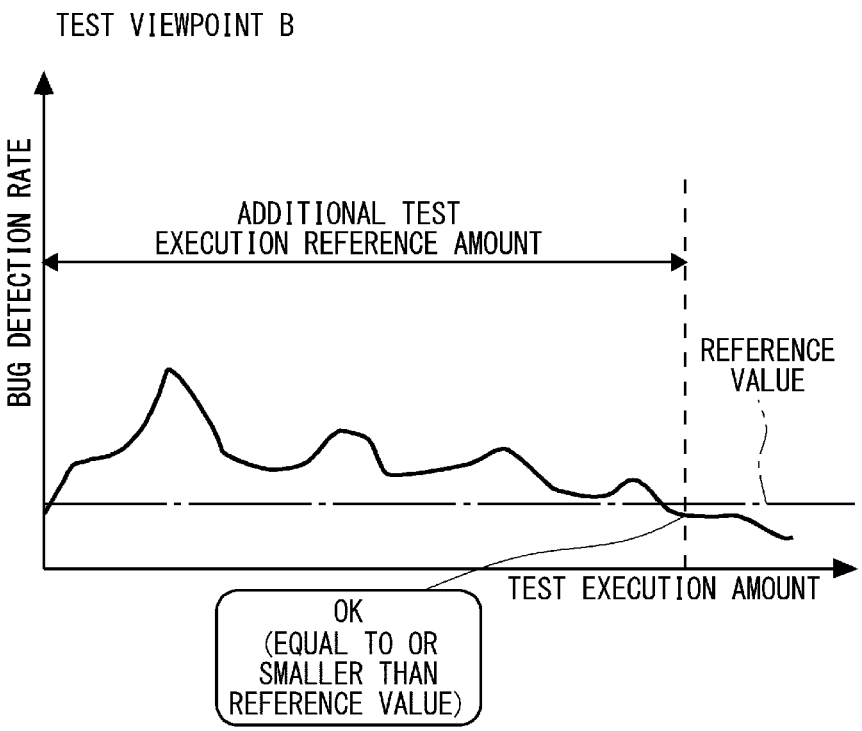
FIG. 11 is a graph showing one example of results of determining bug convergence of a test viewpoint by the software quality determination apparatus according to the first embodiment.
Figure 12:
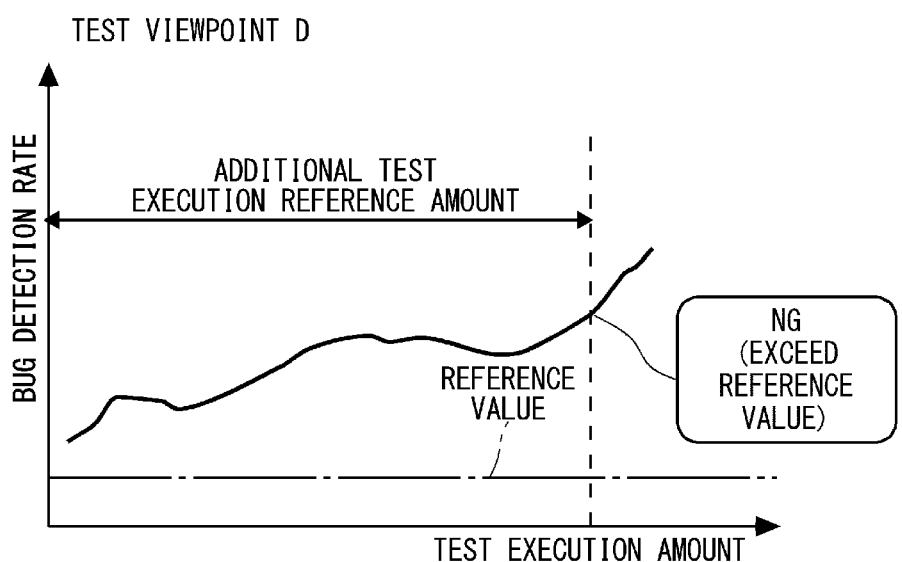
FIG. 12 is a graph showing one example of results of determining bug convergence of a test viewpoint by the software quality determination apparatus according to the first embodiment.

FIGS. 7-10 are graphs each showing one example of results of determining the test execution amount for each of the test viewpoints A, B, C, and D by the software quality determination apparatus 1 according to the first embodiment. FIGS. 11 and 12 are graphs each showing one example of results of determining the bug convergence for each of the test viewpoints B and D by the software quality determination apparatus 1 according to the first embodiment. It is assumed in this example that the aforementioned first method is used to determine the bug convergence after the test execution amount has reached the test execution reference amount. FIGS. 11 and 12 show waveforms after the test execution amount has reached the test execution reference amount, and the origin of the horizontal axis shown in FIGS. 11 and 12 corresponds to the test execution reference amount.

As shown in FIGS. 7 to 10, regarding the test viewpoints B and D, the test execution amount has reached the test execution reference amount. Therefore, the bug convergence determination unit 14 determines whether the bug has converged in the additional test after the test execution amount has reached the test execution reference amount regarding the test viewpoints B and D. On the other hand, regarding the test viewpoints A and C, the test execution amount has not reached the test execution reference amount. Therefore, the bug convergence determination unit 14 does not determine whether the bug has converged.

As shown in FIGS. 11 and 12, regarding the test viewpoints B and D, the bug convergence determination unit 14 determines whether the bug has converged in the additional test after the test execution amount has reached the test execution reference amount. Among them, regarding the test viewpoint B, at the timing when the execution of the additional tests that correspond to the additional test execution reference amount have been completed, the bug detection rate is equal to or smaller than the reference value. Therefore, the bug convergence determination unit 14 determines that the bug of the test viewpoint B has converged. On the other hand, regarding the test viewpoint D, at the timing when the execution of the additional tests that correspond to the additional test execution reference amount have been completed, the bug detection rate exceeds the reference value. Therefore, the bug convergence determination unit 14 determines that the bug of the test viewpoint D has not converged.

<Application of Bug Curve>

The user is able to check whether there is a test viewpoint in which the test has not yet been executed, that is, whether there is a probability that a test viewpoint is not being tested (it is also called a test miss) by applying the software quality determination method according to the first embodiment to a conventional bug curve (this curve is also referred to as a reliability growth curve). The procedure in this case is as follows. In this example, the aforementioned second method is used to determine whether the bug has converged after the test execution amount has reached the test execution reference amount.

Step 1: for each test viewpoint, a graph in which the horizontal axis indicates the "test execution amount" and the vertical axis indicates the "bug detection rate" is created.

Step 2: it is monitored whether "the bug detection rate" becomes equal to or smaller than "the reference value of the bug detection rate" while the test is being executed.

Step 3: when "the bug detection rate" has become equal to or smaller than "the reference value of the bug detection rate", if the "test execution amount" has reached the "test execution reference amount", the additional tests that correspond to the "additional test execution reference amount" are executed. It is then monitored whether the state in which "the bug detection rate" is equal to or smaller than "the reference value of the bug detection rate" continues for the period in which the additional test is being executed.

Step 4: when the state in which "the bug detection rate" is equal to or smaller than "the reference value of the bug detection rate" continues as a result of the monitoring, it is determined that the bug has converged and the quality is thus OK. On the other hand, when the state in which "the bug detection rate" is equal to or smaller than "the reference value of the bug detection rate" is not continuing, it is determined that the bug has not converged and the quality is NG.

The aforementioned Steps 1-4 are executed for each test viewpoint.

Figure 13:
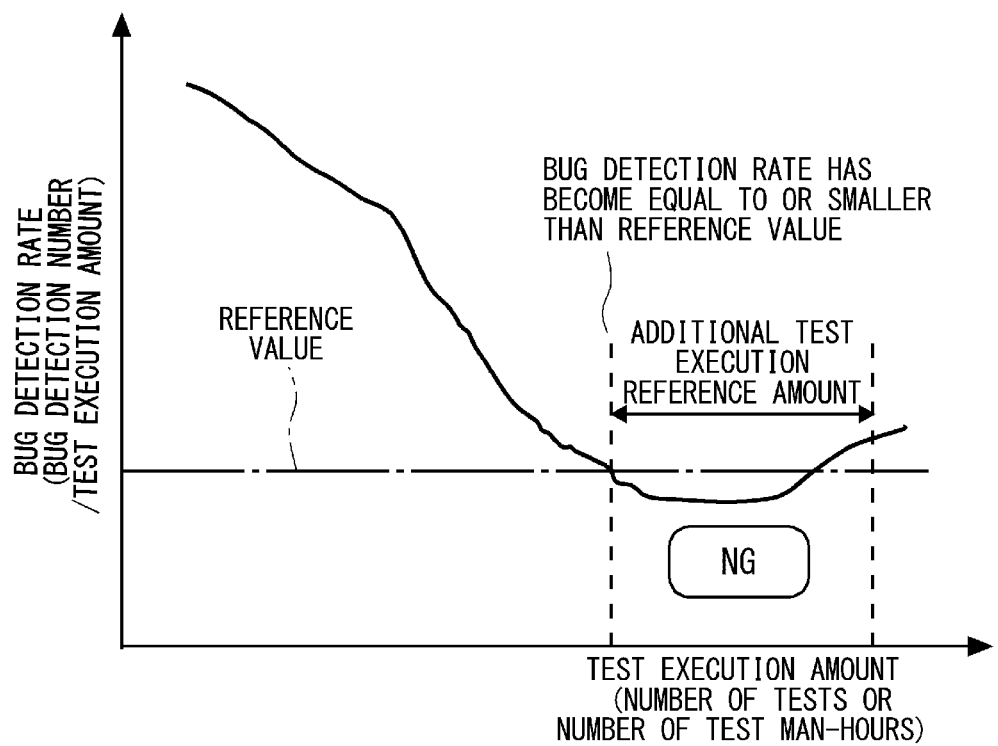
FIG. 13 is a graph showing one example of a bug curve of a test viewpoint.
Figure 14:
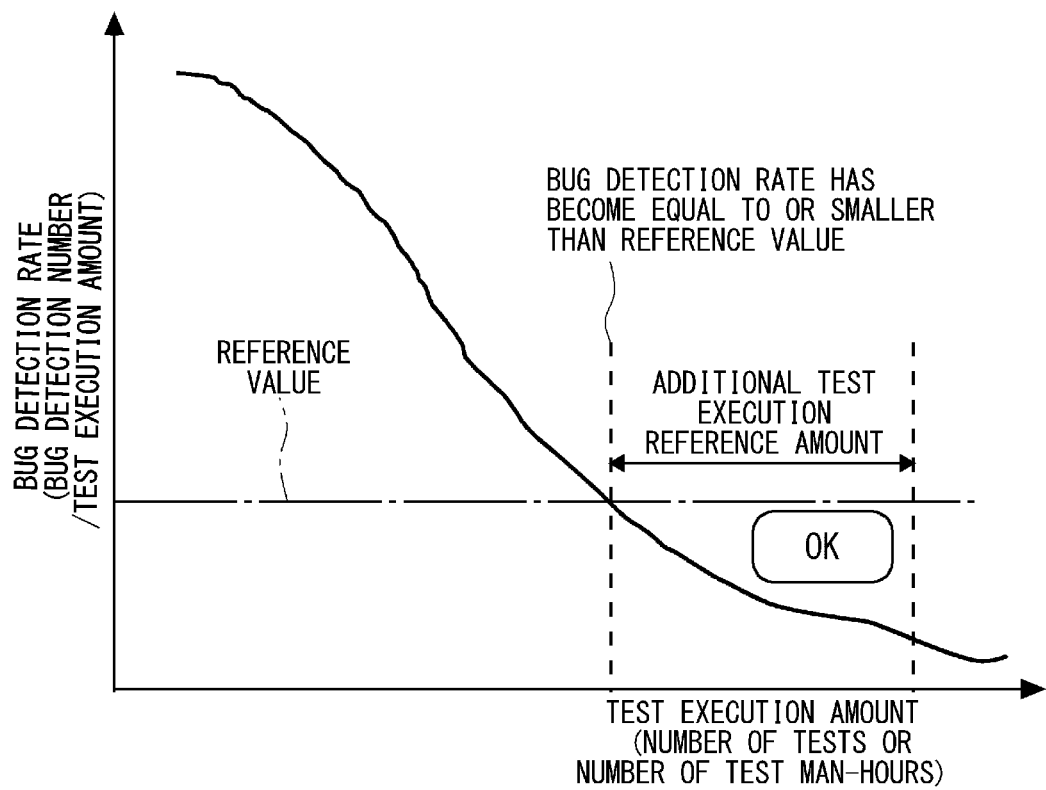
FIG. 14 is a graph showing one example of a bug curve of a test viewpoint.

FIGS. 13 and 14 are graphs each showing one example of the bug curve for each test viewpoint.

Regarding the test viewpoint shown in FIG. 13, the state in which "the bug detection rate" is equal to or smaller than "the reference value of the bug detection rate" is not continuing for the period in which the additional test is being executed. Therefore, the user determines that the bug has not converged and the quality is NG. On the other hand, regarding the test viewpoint shown in FIG. 14, the state in which "the bug detection rate" is equal to or smaller than "the reference value of the bug detection rate" continues for the period in which the additional test is being executed. Therefore, the user determines that the bug has converged and the quality is thus OK.

As described above, the user determines that the test viewpoint shown in FIG. 14 is completely free from bugs and the quality is OK, whereas the user determines that the test viewpoint shown in FIG. 13 is not completely free from bugs and the quality is NG.

Accordingly, the user can make a specific plan such as enhancing the test for a problematic test viewpoint whose quality is NG.

Next, a method of checking whether there is a probability of not being tested by applying the software quality determination method according to the first embodiment to the conventional bug curve will be explained with some specific examples. In the following description, there are six test viewpoints, that is, "basics", "interactions", "operational sequence", "load•stress", "recovery•exceptions", and "Graphical User Interface (GUI)" based on the discovery trigger of the ODC analysis.

Figure 15:
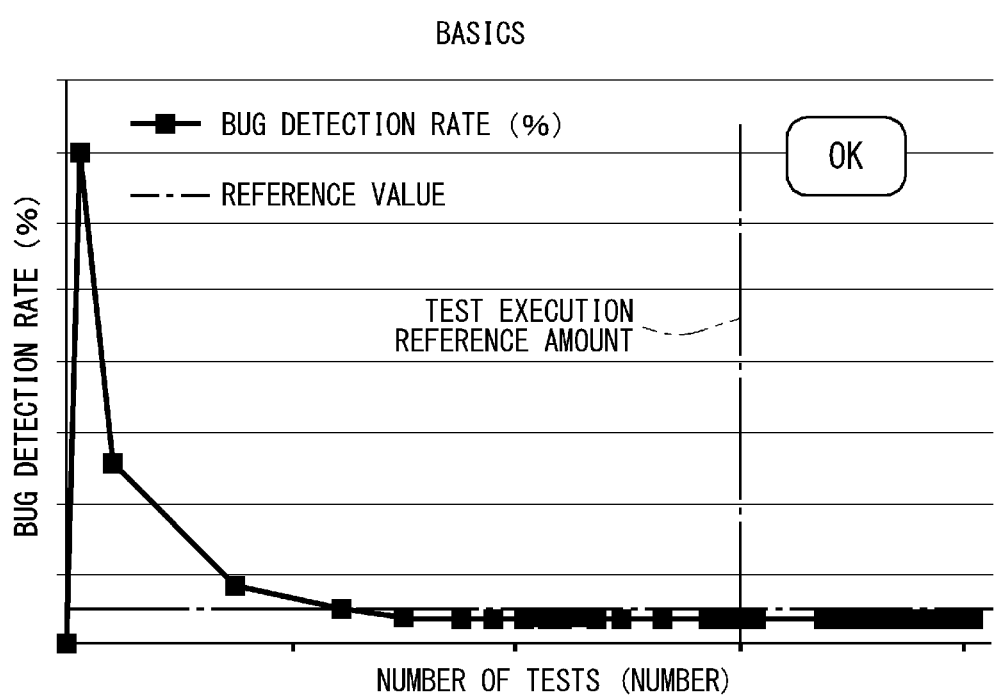
FIG. 15 is a graph showing one example of a bug curve of a test viewpoint.
Figure 16:
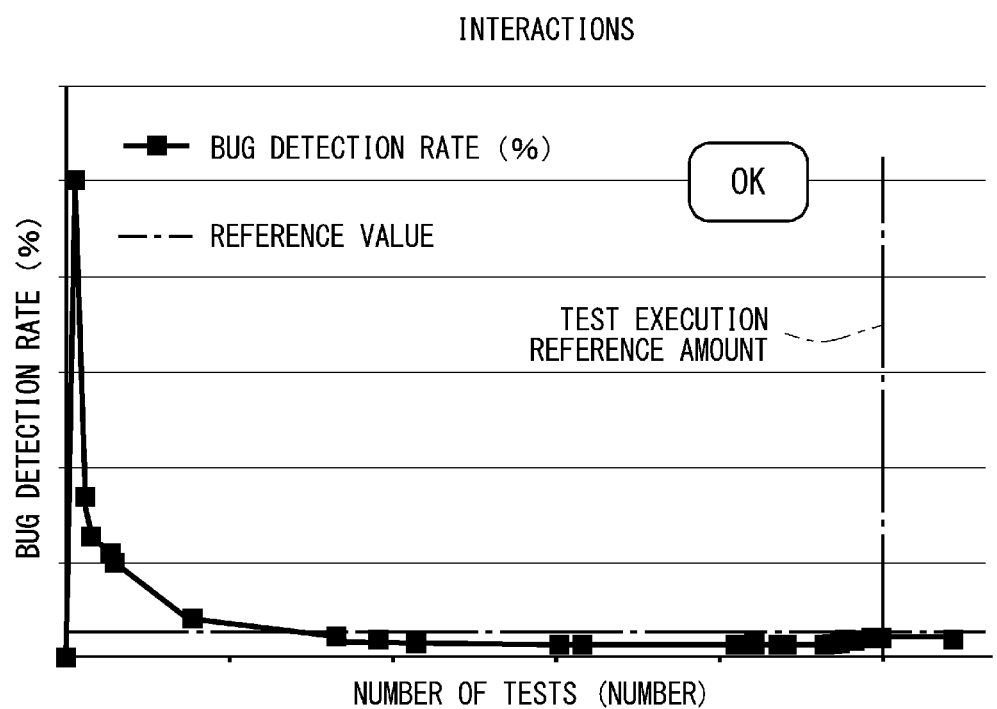
FIG. 16 is a graph showing one example of a bug curve of a test viewpoint.
Figure 17:
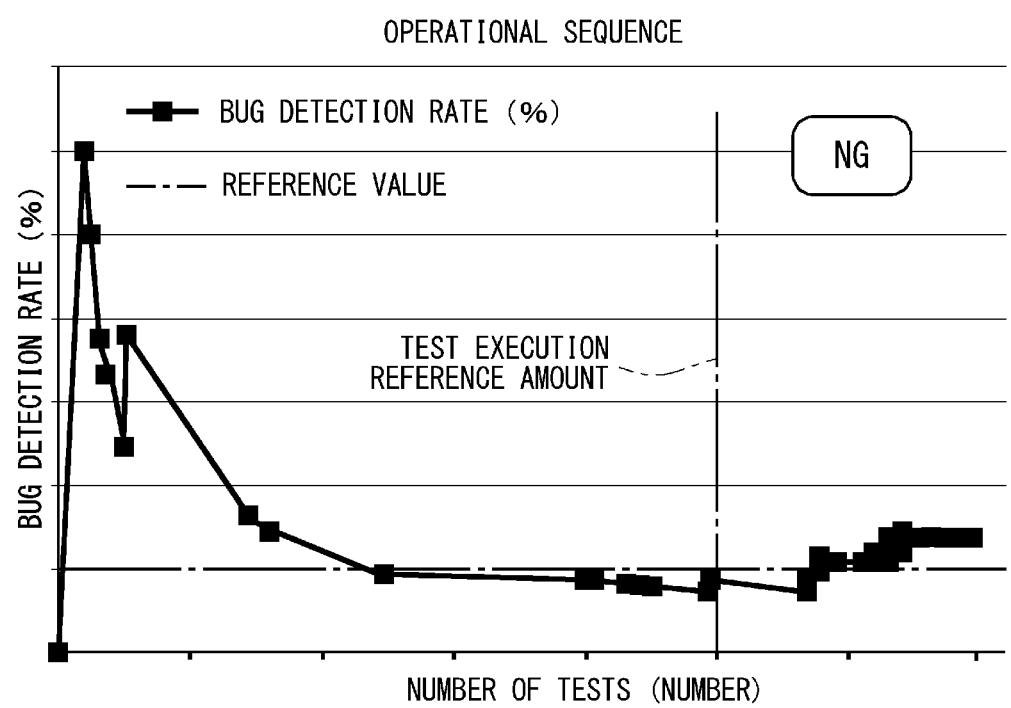
FIG. 17 is a graph showing one example of a bug curve of a test viewpoint.
Figure 18:
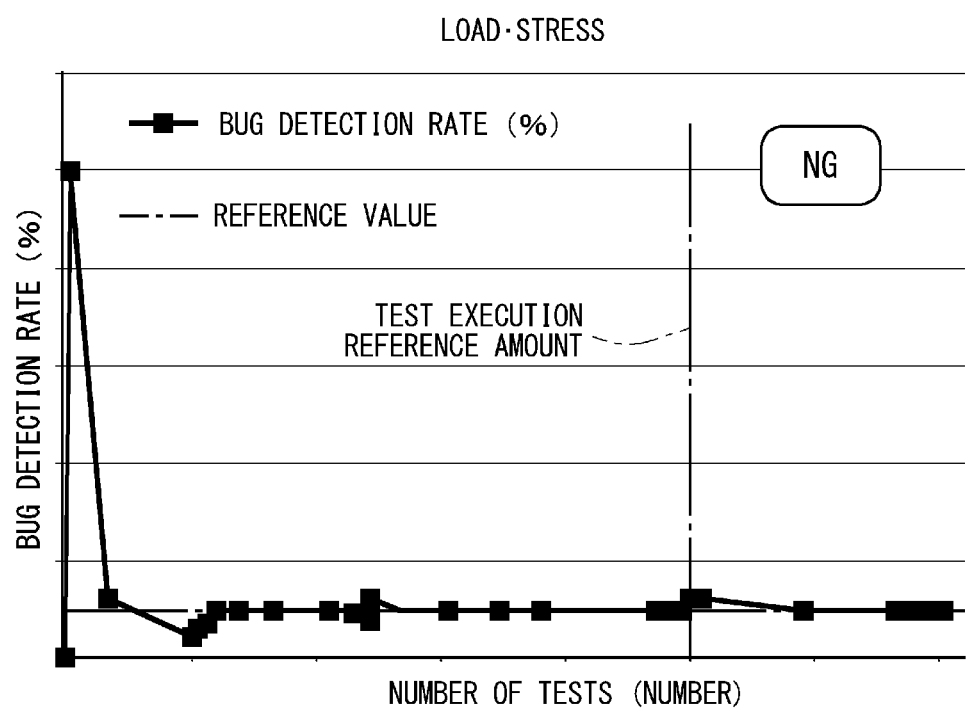
FIG. 18 is a graph showing one example of a bug curve of a test viewpoint.
Figure 19:
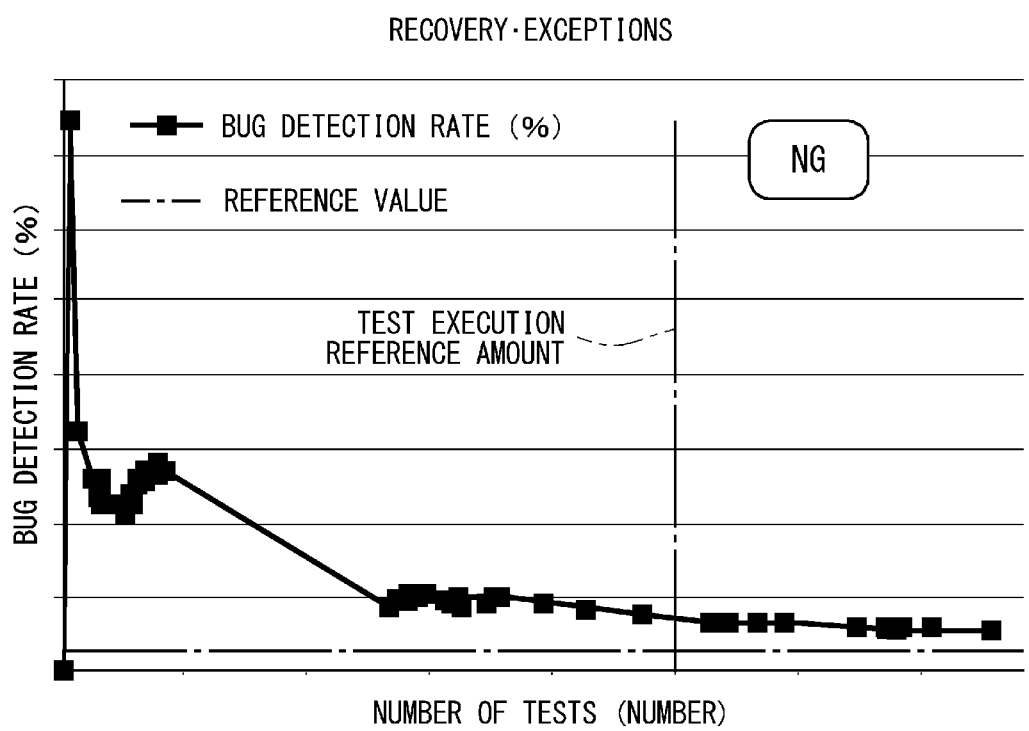
FIG. 19 is a graph showing one example of a bug curve of a test viewpoint.
Figure 20:
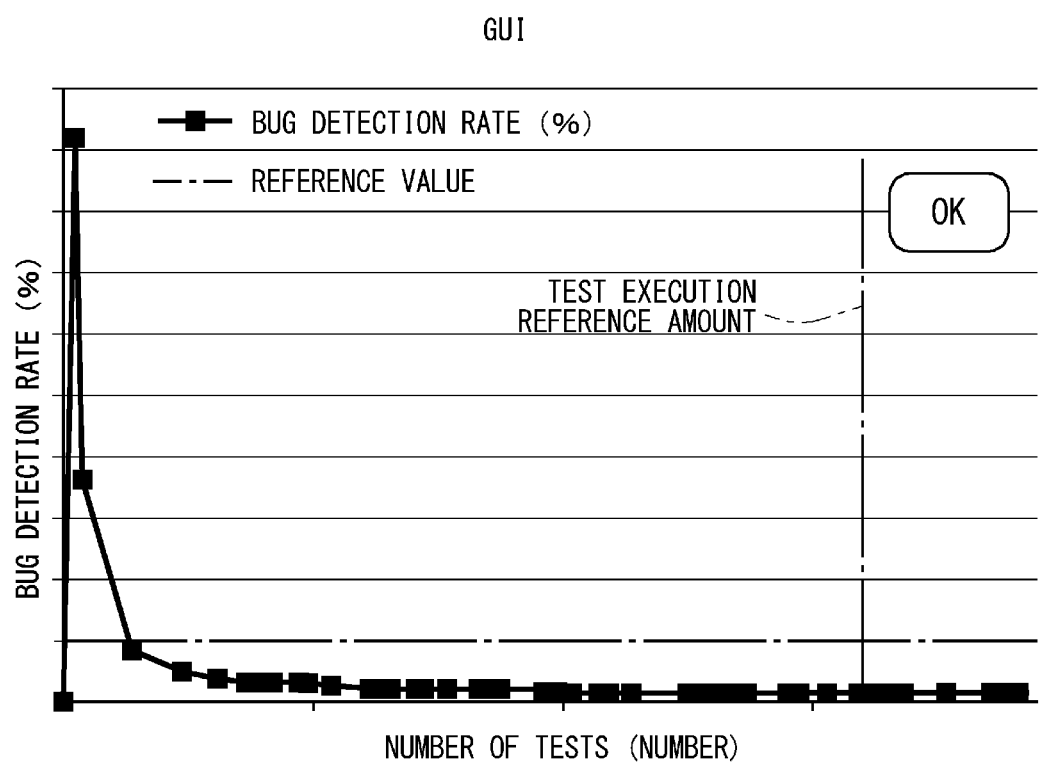
FIG. 20 is a graph showing one example of a bug curve of a test viewpoint.

FIGS. 15-20 are graphs each showing one example of the bug curve for each test viewpoint. FIG. 15 shows the bug curve of "basics", FIG. 16 shows that of "interactions", FIG. 17 shows that of "operational sequence", FIG. 18 shows that of "load•stress", FIG. 19 shows that of "recovery•exceptions", and FIG. 20 shows that of "GUI". FIG. 21 collectively shows the results of the determinations in FIGS. 15-20.

When the bug detection rate exceeds the reference value after the test execution amount has reached the test execution reference amount, the user determines that the bug has not converged and there is still a high probability that a bug will be detected (the quality is NG). On the other hand, when the bug detection rate is equal to or smaller than the reference value after the test execution amount has reached the test execution reference amount, the user determines that the bug has converged and a probability that a bug will be detected is low (the quality is OK).

As shown in FIGS. 15-21, regarding the "basics", the "interactions", and the "GUI", the bug detection rate becomes equal to or smaller than the reference value after the test execution amount has reached the test execution reference amount. Therefore, the user determines that the quality is OK.

On the other hand, regarding the "operational sequence", the "load•stress", and the "recovery•exceptions", the bug detection rate exceeds the reference value after the test execution amount has reached the test execution reference amount. Therefore, the user determines that the quality is NG. To be more specific, regarding the "operational sequence", the difference between the bug detection rate and the reference value is large and the bug detection rate is getting worse. Regarding the "load•stress", although the difference between the bug detection rate and the reference value is large, the bug detection rate is getting better. Regarding the "recovery•exceptions", although the difference between the bug detection rate and the reference value is extremely large, the bug detection rate is getting better.

Accordingly, the user is able to determine the plans for the respective test viewpoints. For example, the user may make a plan to intensively execute tests for the "operational sequence", the "load•stress", and the "recovery•exceptions" in which the quality has been determined to be NG, and make a plan to reduce the priority (decrease the test execution amount or stop the test) for the "basics", "interactions", and "GUI" in which the quality has been determined to be OK. Therefore, the user is able to execute the cost-effective tests.

<Test Execution Method for Each Test Viewpoint>

FIG. 22 is a diagram showing one example of the test execution method for each test viewpoint.

As shown in FIG. 22, the user determines the order of executing the tests of the respective test viewpoints in advance like Phases 1, 2, 3, 4, 5, and 6, and the test of the test viewpoint is completed at each phase. When the test of the test viewpoint at the next phase is executed, the results of executing the test of the test viewpoint at the previous phase are reviewed. As a result, when there is a problem in the bug convergence level of the test viewpoint at the previous phase, a test for improving the bug convergence level of the test viewpoint at the previous phase is added to the test for the test viewpoint at the next phase. In the example shown in FIG. 22, when the test of "recovery•exceptions/start•re-start" at Phase 5 is executed, the results of executing the test of the "load/stress" at the previous phase 4 are reviewed, as a result of which it turns out that there is a problem in the bug convergence level of "load/stress". Therefore, a test for improving the bug convergence level of "load/stress" at the previous phase 4 is added to the test for "recovery•exceptions/start•re-start" at Phase 5. Regarding the order of executing the tests of the viewpoints, the test of the test viewpoint capable of extracting the bug that has the highest risk is preferably performed first.

<Effects of First Embodiment>

As described above, according to the first embodiment, the bug detection rate calculator 13 calculates, for each test viewpoint, the bug detection rate of the test viewpoint, and the bug convergence determination unit 14 determines, for each test viewpoint, the bug convergence of the test viewpoint depending on whether the bug detection rate of the test viewpoint is equal to or smaller than the reference value of the test viewpoint after the test execution amount of the test viewpoint has reached the test execution reference amount of the test viewpoint.

Accordingly, it is possible to determine whether the bug has converged without using the previous bug occurrence result data. Further, since it is determined whether the bug has converged after the test execution amount has reached the test execution reference amount, the bug convergence is determined after the period in which data including a lot of uncertain elements is generated such as a period in which the test execution amount is small and a period in which the number of bugs that have been detected is large. Therefore, it is possible to improve the accuracy of determining whether the bug has converged. Further, since the bug convergence is determined for each test viewpoint, it is possible to eliminate a probability that one test viewpoint is not being tested, whereby it is possible to prevent an unexpected false determination in the bug convergence determination.

Second Embodiment

In the aforementioned first embodiment, the user inputs and sets the test execution reference amount for each test viewpoint. Therefore, the test execution reference amount does not necessarily correspond to the development scale of the test viewpoint. The development scale is one of the size of a source code, the index indicating the complexity of the source code, a function point (FP) and the like.

Therefore, in the aforementioned first embodiment, there is a probability, to a certain extent, that a bug may not be detected and a false determination may be made that the bug has converged since the test execution amount with respect to the development scale of the test viewpoint is small.

On the other hand, according to the second embodiment, the test execution reference amount for each test viewpoint is made to correspond to the development scale of each test viewpoint, whereby it is possible to prevent a false determination in the bug convergence determination.

<Configuration of Software Quality Determination Apparatus According to Second Embodiment>

First, a configuration of a software quality determination apparatus 2 according to the second embodiment will be explained.

Figure 23:
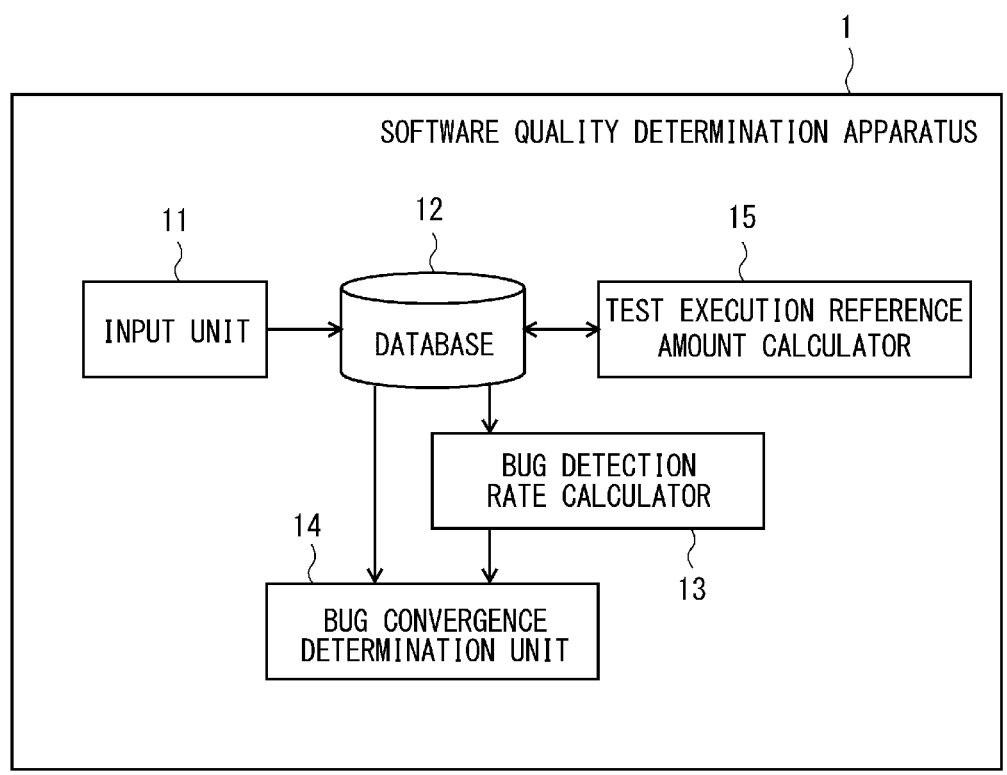
FIG. 23 is a block diagram showing one example of a block configuration of a software quality determination apparatus according to a second embodiment.

FIG. 23 is a block diagram showing one example of a block configuration of the software quality determination apparatus 2 according to the second embodiment.

As shown in FIG. 23, the software quality determination apparatus 2 according to the second embodiment further includes a test execution reference amount calculator 15 in addition to the components in the aforementioned first embodiment. In the following description, a configuration different from that of the aforementioned first embodiment will be explained.

The database 12 holds, besides the data similar to that described in the aforementioned first embodiment, a development scale for each test viewpoint and a test execution reference amount per unit development scale for each test viewpoint.

The test execution reference amount calculator 15 calculates, for each test viewpoint, the test execution reference amount of the test viewpoint. Specifically, the test execution reference amount calculator 15 multiplies the test execution reference amount per unit development scale held in the database 12 by the development scale held in the database 12, thereby calculating the test execution reference amount.

The database 12 holds the test execution reference amount calculated for each test viewpoint by the test execution reference amount calculator 15 as the test execution reference amount for each test viewpoint.

The configurations other than the aforementioned configurations are similar to those stated in the aforementioned first embodiment.

<Test Execution Reference Amount According to Second Embodiment>

A specific example of the test execution reference amount per unit development scale for each test viewpoint according to the second embodiment will be explained. It is assumed in this example that the test viewpoints are similar to those shown in FIG. 2.

As shown in FIG. 24, the test execution reference amount per unit development scale for each test viewpoint may be the number of test man-hours/KLOC. In the example shown in FIG. 24, when the test execution reference amount per unit development scale of the "functionality" is set to A, the test execution reference amount per unit development scale of the "efficiency", that of the "reliability", that of the "usability", that of the "maintainability", and that of the "portability" are respectively 0.1A, 0.4A, 0.6A, 1.1A, and 0.2A.

Further, in the example shown in FIG. 25, in the case of the combined test, when the test execution reference amount per unit development scale of the "functionality" is set to A, the test execution reference amount per unit development scale of the "efficiency", that of the "reliability", that of the "usability", that of the "maintainability", and that of the "portability" are respectively 0.7A, 0.5A, 0.5A, 0.5A, and 0.1A. Further, in the case of the system test, when the test execution reference amount per unit development scale of the "functionality" is set to a, the test execution reference amount per unit development scale of the "efficiency", that of the "reliability", that of the "usability", that of the "maintainability", and that of the "portability" are respectively 0.8a, 0.3a, 0.3a, 0.1a, and 0.1a.

Further, statistical data of the number of tests per unit development scale disclosed in the following Non-Patent Literature 3 may be used for the test execution reference amount per unit development scale for each test viewpoint.

Non-Patent Literature 3: Software Reliability Enhancement Center, Technology Headquarters, Information-technology Promotion Agency, independent administrative agency, "White Papers on Software Development Data, 2016-2017", Oct. 1, 2016, page 214.

<Software Quality Determination Method According to Second Embodiment>

Next, a software quality determination method by the software quality determination apparatus 2 according to the second embodiment will be explained.

Figure 26:
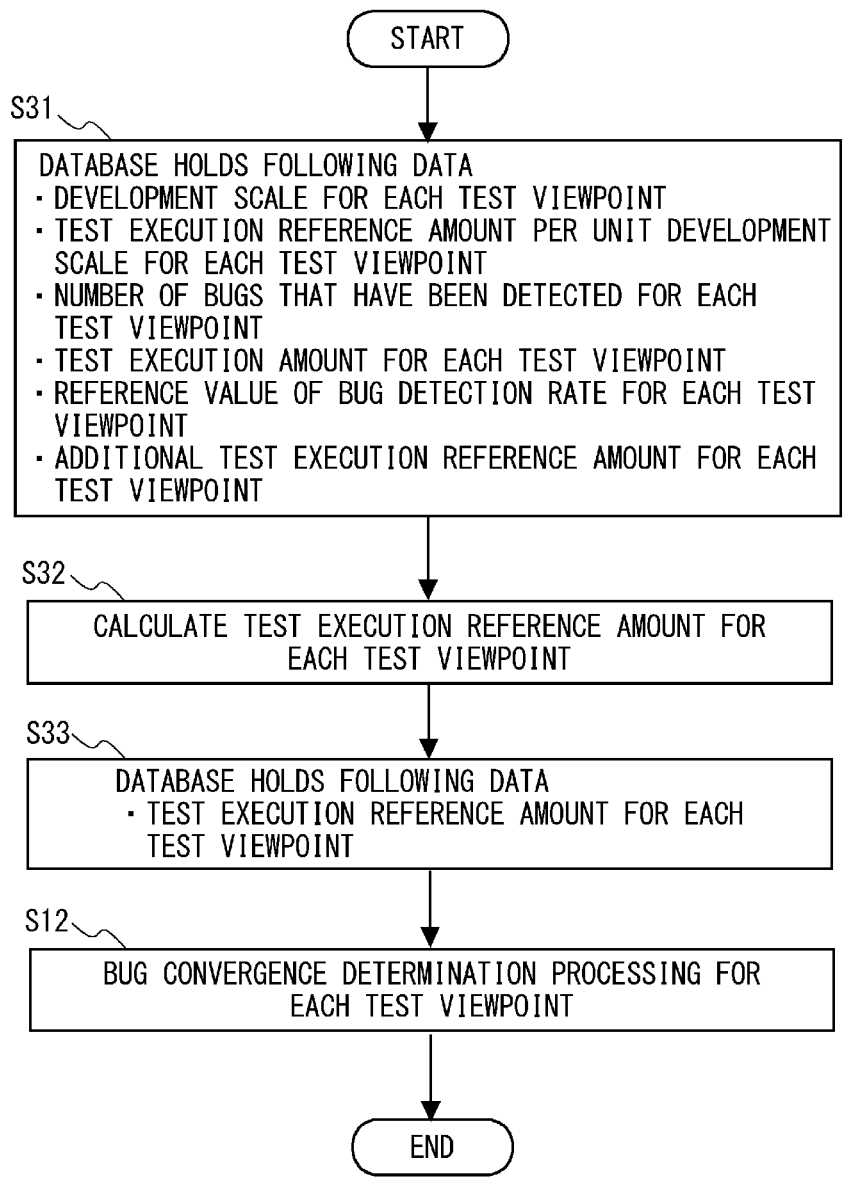
FIG. 26 is a flowchart showing one example of a software quality determination method by a software quality determination apparatus according to the second embodiment.

FIG. 26 is a flowchart showing the software quality determination method by the software quality determination apparatus 2 according to the second embodiment.

As shown in FIG. 26, the database 12 acquires and holds the following data that the user has input into the input unit 11 and set in the input unit 11 (Step S31).

development scale for each test viewpoint the test execution reference amount per unit development scale for each test viewpoint the number of bugs that have been detected for each test viewpoint test execution amount for each test viewpoint
the reference value of the bug detection rate for each test viewpoint
additional test execution reference amount for each test viewpoint Next, the test execution reference amount calculator 15 multiplies, for each test viewpoint, the test execution reference amount per unit development scale of the test viewpoint by the development scale of this test viewpoint, thereby calculating the test execution reference amount of this test viewpoint (Step S32).

Next, the test execution reference amount calculator 15 registers the test execution reference amount for each test viewpoint calculated above in the database 12 and the database 12 holds the test execution reference amount for each test viewpoint (Step S33).

In the following processing, similar to the processing in the aforementioned first embodiment, for each test viewpoint, the bug convergence determination processing for determining the bug convergence of the test viewpoint is performed (Step S12). The bug convergence determination processing in Step S12 is also executed by the flow shown in FIG. 6, similar to the processing in the aforementioned first embodiment.

Effects of Second Embodiment

As described above, according to the second embodiment, the test execution reference amount calculator 15 is able to calculate, for each test viewpoint, the test execution reference amount of the test viewpoint in accordance with the development scale of the test viewpoint, and the bug convergence determination unit 14 determines, for each test viewpoint, the bug convergence of the test viewpoint after the test execution amount of the test viewpoint has reached the test execution reference amount calculated in accordance with the development scale of the test viewpoint.

Accordingly, a situation in which, a bug is not detected and the bug convergence determination is made in this state since the test execution amount with respect to the development scale of the test viewpoint is small can be prevented. It is therefore possible to further reduce a false determination in the bug convergence determination.

The other effects of the second embodiment are similar to those in the first embodiment.

Further, while the test execution reference amount that corresponds to the development scale for each test viewpoint has been used for the test execution reference amount for each test viewpoint in the second embodiment, the additional test execution reference amount that corresponds to the development scale for each test viewpoint may be used for the additional test execution reference amount for each test viewpoint. In this case, the database 12 may further hold the additional test execution reference amount per unit development scale for each test viewpoint and the test execution reference amount calculator 15 may calculate the additional test execution reference amount in accordance with the development scale for each test viewpoint.

While the present disclosure has been described above with reference to the embodiments, the present disclosure is not limited to the aforementioned embodiments and may be changed as appropriate without departing from the spirit of the present disclosure.

For example, the software quality determination apparatuses 1 and 2 according to the aforementioned first and second embodiments may be applied to a design and implementation review process. In this case, the test execution amount may be replaced by review man-hours, the development scale may be replaced by a volume of the document (the number of rows, the number of pages, the number of characters etc.), and the test viewpoints may be replaced by review viewpoints. A viewpoint table that an organization has or a discovery trigger of the review process of the ODC analysis may be used, for example, for the review viewpoints.

Further, the software quality determination apparatuses 1 and 2 according to the aforementioned first and second embodiments are achieved by, for example, a computer having a hardware configuration formed of a processor such as a Central Processing Unit (CPU) that performs operation processing or the like, a memory formed of a Read Only Memory (ROM), a Random Access Memory (RAM) or the like that stores a program executed by the processor or various kinds of data, and an interface unit (I/F) that inputs/outputs signals to/from an external device. The processor, the memory, and the interface unit are interconnected with one another via a data bus or the like.

The memory serves as the database 12. Further, the memory stores a program that achieves functions of the bug detection rate calculator 13, the bug convergence determination unit 14, and the test execution reference amount calculator 15, and the processor executes these programs, thereby achieving the functions of the bug detection rate calculator 13, the bug convergence determination unit 14, and the test execution reference amount calculator 15.

The program(s) can be stored and provided to a computer using any type of non-transitory computer readable media. Non-transitory computer readable media include any type of tangible storage media. Examples of non-transitory computer readable media include magnetic storage media (such as flexible disks, magnetic tapes, hard disk drives, etc.), optical magnetic storage media (e.g., magneto-optical disks), Compact Disc Read Only Memory (CD-ROM), CD-Recordable (CD-R), CD-ReWritable (CD-R/W), and semiconductor memories (such as mask ROM, Programmable ROM (PROM), Erasable PROM (EPROM), flash ROM, Random Access Memory (RAM), etc.). The program (s) may be provided to a computer using any type of transitory computer readable media. Examples of transitory computer readable media include electric signals, optical signals, and electromagnetic waves. Transitory computer readable media can provide the program to a computer via a wired communication line (e.g., electric wires, and optical fibers) or a wireless communication line.

From the disclosure thus described, it will be obvious that the embodiments of the disclosure may be varied in many ways. Such variations are not to be regarded as a departure from the spirit and scope of the disclosure, and all such modifications as would be obvious to one skilled in the art are intended for inclusion within the scope of the following claims.

What is claimed is:

1. A software quality determination apparatus configured to determine convergence of a bug generated in a system, the apparatus comprising:
   circuitry configured to:
   calculate, for each test viewpoint, which is a viewpoint when the system is tested, a detection rate of a bug generated in a test of the test viewpoint;
   calculate, for each test viewpoint, an execution reference amount of the test viewpoint, which serves as a reference of a test execution amount of the test viewpoint, in accordance with a development scale of the test viewpoint, the development scale corresponding to one of (i) a size of a source code to be tested and (ii) an index indicating a complexity of the source code to be tested; and for each test viewpoint:
determine whether the test execution amount of the test viewpoint has reached the calculated execution reference amount, when the test execution amount of the test viewpoint has reached the calculated execution reference amount, determine, the bug convergence of the test viewpoint depending on whether the calculated detection rate of the test viewpoint is equal to or smaller than a reference value, which serves as a reference of the detection rate of the test viewpoint, for additional text execution of the test view point after the test execution amount of the test viewpoint has reached the calculated execution reference amount, and when the test execution amount of the test viewpoint has not reached the calculated execution reference amount, wait until the test execution amount of the test viewpoint is determined to have reached the calculated execution reference amount to determine the bug convergence of the test viewpoint.

2. The software quality determination apparatus according to claim 1, wherein the circuitry is configured to determine, for the each test viewpoint, the bug convergence of the test viewpoint for a predetermined period after the execution amount of the test viewpoint has reached the calculated execution reference amount of the test viewpoint.

3. A software quality determination method by a software quality determination apparatus for determining convergence of a bug generated in a system, the method comprising:

calculating, for each test viewpoint, which is a viewpoint when the system is tested, a detection rate of a bug generated in a test of the test viewpoint;

calculating, for each test viewpoint, an execution reference amount of the test viewpoint, which serves as a reference of a test execution amount of the test viewpoint, in accordance with a development scale of the test viewpoint, the development scale corresponding to one of (i) a size of a source code to be tested and (ii) an index indicating a complexity of the source code to be tested; and for each test viewpoint:
determining whether the test execution amount of the test viewpoint has reached the calculated execution reference amount, when the test execution amount of the test viewpoint has reached the calculated execution reference amount, determining the bug convergence of the test viewpoint depending on whether the calculated detection rate of the test viewpoint is equal to or smaller than a reference value, which serves as a reference of the detection rate of the test viewpoint, for additional text execution of the test view point after the test execution amount of the test viewpoint has reached the calculated execution reference amount, and when the test execution amount of the test viewpoint has not reached the calculated execution reference amount, waiting until the test execution amount of the test viewpoint is determined to have reached the calculated execution reference amount to determine the bug convergence of the test viewpoint.

4. A non-transitory computer readable medium storing a software quality determination program for causing a computer that determines convergence of a bug generated in a system to execute the following procedures of:

calculating, for each test viewpoint, which is a viewpoint when the system is tested, a detection rate of a bug generated in a test of the test viewpoint;

calculating, for each test viewpoint, an execution reference amount of the test viewpoint, which serves as a reference of a test execution amount of the test viewpoint, in accordance with a development scale of the test viewpoint, the development scale corresponding to one of (i) a size of a source code to be tested and (ii) an index indicating a complexity of the source code to be tested; and for each test viewpoint:
determining whether the test execution amount of the test viewpoint has reached the calculated execution reference amount, when the test execution amount of the test viewpoint has reached the calculated execution reference amount, determining the bug convergence of the test viewpoint depending on whether the calculated detection rate of the test viewpoint is equal to or smaller than a reference value, which serves as a reference of the detection rate of the test viewpoint, for additional text execution of the test view point after the test execution amount of the test viewpoint has reached the calculated execution reference amount, and when the test execution amount of the test viewpoint has not reached the calculated execution reference amount, waiting until the test execution amount of the test viewpoint is determined to have reached the calculated execution reference amount to determine the bug convergence of the test viewpoint.

* * * * *